(12) United States Patent
Mutch

(10) Patent No.: US 10,926,924 B2
(45) Date of Patent: Feb. 23, 2021

(54) DRINK CONTAINER LID ASSEMBLY

(71) Applicant: Helen of Troy Limited, St. Michael (BB)

(72) Inventor: Martin Mutch, New York, NY (US)

(73) Assignee: Helen of Troy Limited, St. Michael (BB)

(*) Notice: Subject to any disclaimer, the term of this patent is extended or adjusted under 35 U.S.C. 154(b) by 341 days.

(21) Appl. No.: 15/981,991

(22) Filed: May 17, 2018

(65) Prior Publication Data

US 2019/0352059 A1 Nov. 21, 2019

(51) Int. Cl.
*B65D 47/06* (2006.01)
*B65D 43/02* (2006.01)

(52) U.S. Cl.
CPC ....... B65D 47/068 (2013.01); B65D 43/0212 (2013.01); *B65D 2543/00046* (2013.01); *B65D 2543/00092* (2013.01); *B65D 2543/00537* (2013.01)

(58) Field of Classification Search
CPC ........ B65D 47/068; B65D 2543/00046; B65D 43/0231; B65D 2251/20; A47G 19/2272; A47J 41/0011
See application file for complete search history.

(56) References Cited

U.S. PATENT DOCUMENTS

| | | | |
|---|---|---|---|
| 3,613,929 A | 10/1971 | Treanor | |
| 3,749,270 A | 7/1973 | Affleck | |
| 4,444,327 A | 4/1984 | Hedgewick | |
| 6,202,877 B1 | 3/2001 | La Torre et al. | |
| 6,702,138 B1 | 3/2004 | Bielecki et al. | |
| 7,681,754 B1 | 3/2010 | Ross | |
| 7,819,280 B2 | 10/2010 | Perra | |
| 8,348,078 B2 | 1/2013 | Lane | |
| 8,393,487 B1 | 3/2013 | Pillers et al. | |
| 8,459,468 B2 | 6/2013 | Lin | |
| 8,708,203 B2 | 4/2014 | Laible | |
| 9,815,600 B2 | 11/2017 | Cote, Sr. et al. | |
| 9,883,759 B2 | 2/2018 | Kelaher et al. | |
| 2016/0122090 A1* | 5/2016 | Cote, Sr. | A47G 19/2272 220/323 |
| 2016/0318693 A1 | 11/2016 | Hein et al. | |
| 2017/0027350 A1 | 2/2017 | Onza et al. | |
| 2018/0050849 A1 | 2/2018 | Egan et al. | |
| 2018/0244429 A1 | 8/2018 | Seiders et al. | |

* cited by examiner

*Primary Examiner* — Andrew T Kirsch
(74) *Attorney, Agent, or Firm* — Rankin, Hill & Clark LLP

(57) ABSTRACT

A lid assembly for a drink container includes a top, a bottom, and a plunger. The top includes a drink opening. The bottom includes a drink path opening. With the plunger connected with the top and the bottom the top is rotatable about a rotational axis with respect to the bottom to move the plunger in a direction parallel with the rotational axis such that the lid assembly is movable into an open position in which fluid in a drink container to which the lid assembly is attached is able to flow around the plunger and through the drink opening, a closed position in which fluid in the drink container is blocked by the plunger from flowing through the drink opening, and an unlocked position in which the top is removable from the bottom by moving the top with respect to the bottom in a direction parallel with the rotational axis.

19 Claims, 8 Drawing Sheets

DRINK CONTAINER LID ASSEMBLY

BACKGROUND

Drink container lids or beverage containers help maintain the temperature of the beverage within the container and also reduce the likelihood of spills of the beverage from the container during use. Many such drink container lids include a drink opening that can be selectively opened and closed. The drink opening can be opened and closed by pushing down on a button to open a valve below the drink opening. Oftentimes a secondary lid is provided that pivots back and forth to open and close the drink opening. Sliding secondary lids are also provided to open and close the drink opening. Improvements can be made to drink container lids to aid in further maintaining the temperature of the beverage within the container as well as to aid with the cleanability of the drink container lid.

SUMMARY OF THE INVENTION

In view of the foregoing, a lid assembly for a drink container includes a top, a bottom, and a plunger. The top includes a drink opening. The bottom includes a drink path opening. With the plunger connected with the top and the bottom the top is rotatable about a rotational axis with respect to the bottom to move the plunger in a direction parallel with the rotational axis such that the lid assembly is movable into an open position in which fluid in an associated drink container to which the lid assembly is attached is able to flow around the plunger and through the drink opening, a closed position in which fluid in the associated drink container to which the lid assembly is connected is blocked by the plunger from flowing through the drink opening, and an unlocked position in which the top is removable from the bottom by moving the top with respect to the bottom in a direction parallel with the rotational axis.

DETAILED DESCRIPTION

Figure 1:
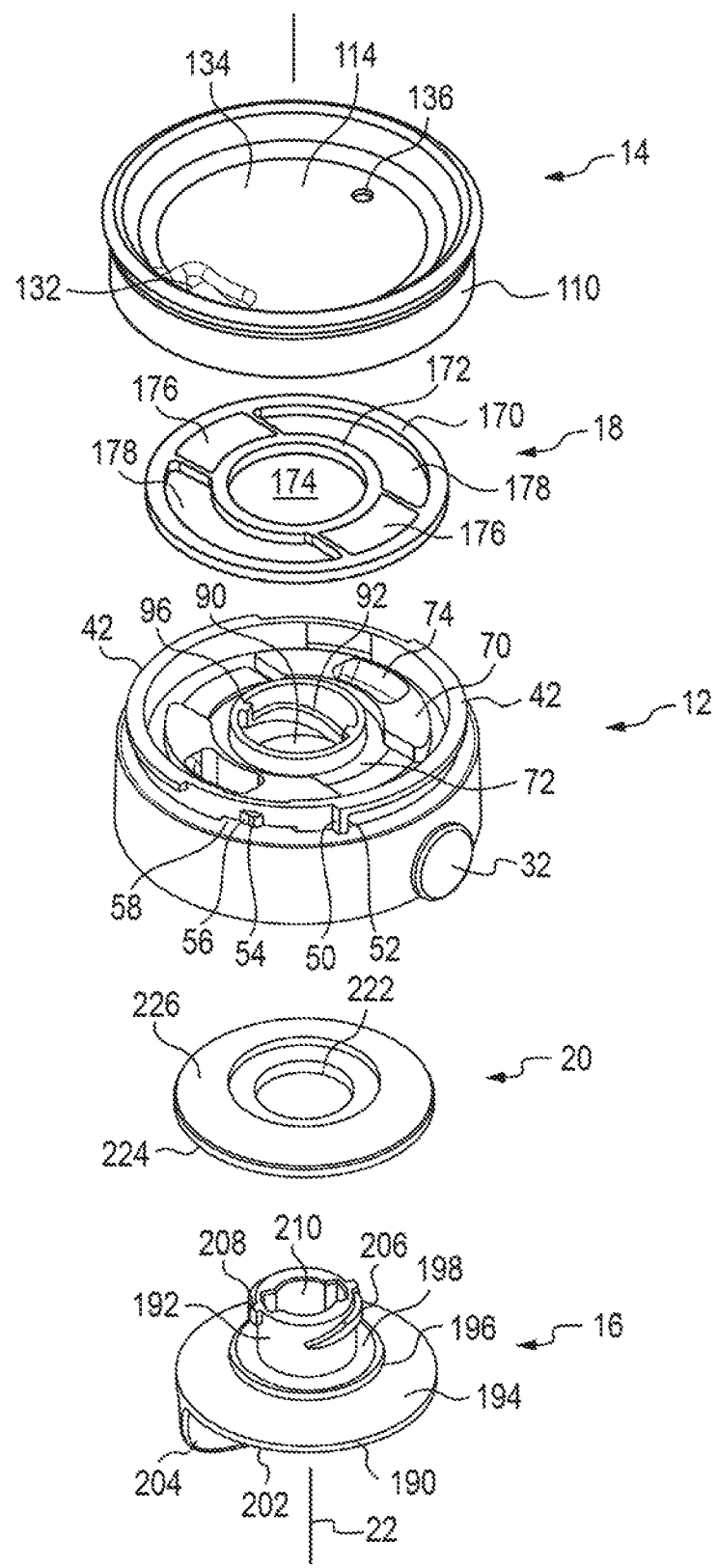
FIG. 1 is an exploded view of a lid assembly for a drink container.
Figure 2:
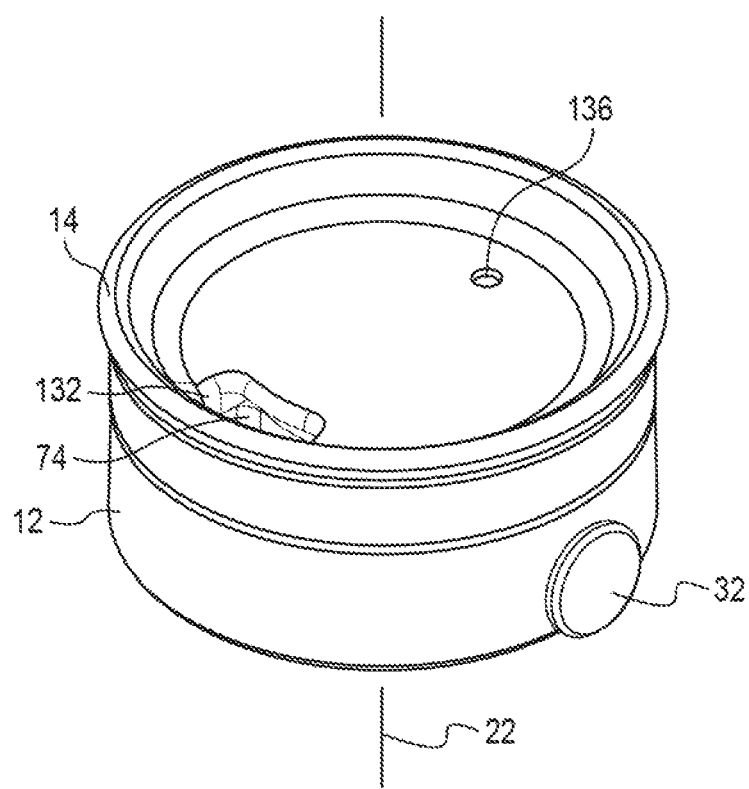
FIG. 2 is a perspective view of the lid assembly of FIG. 1 when assembled an open position.
Figure 3:
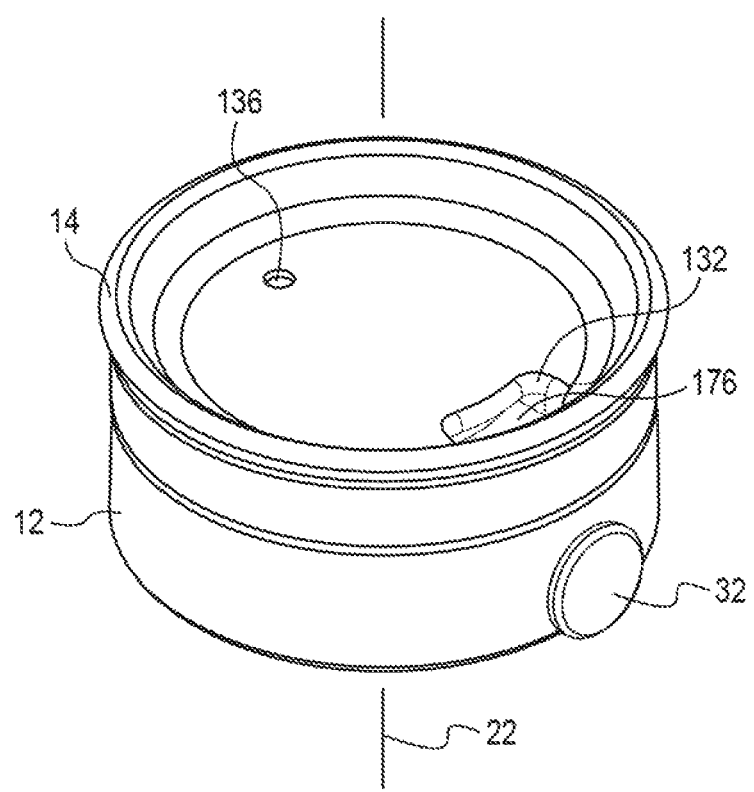
FIG. 3 is a perspective view of the lid assembly of FIG. 1 when assembled in a closed position.

With reference to FIG. 1, a lid assembly 10 includes a bottom 12, a top 14, and a plunger 16. The lid assembly 10 is also depicted as including a top seal 18 and a plunger seal 20. The top 14 rotates about a rotational axis 22 with respect to the bottom 12 to move the lid assembly 10 between an open position, which is shown in FIG. 2, and a closed position, which is shown in FIG. 3. Rotation of the top 14 with respect to the bottom 12 moves the plunger 16 with respect to the bottom 12 in a direction parallel with the rotational axis 22. When in the open position, liquid residing in a container to which the lid assembly 10 is attached can pass through the lid assembly 10 to be drunk by a user. When in the closed position, the beverage in the container is precluded from traveling through the lid assembly 10.

Figure 4:
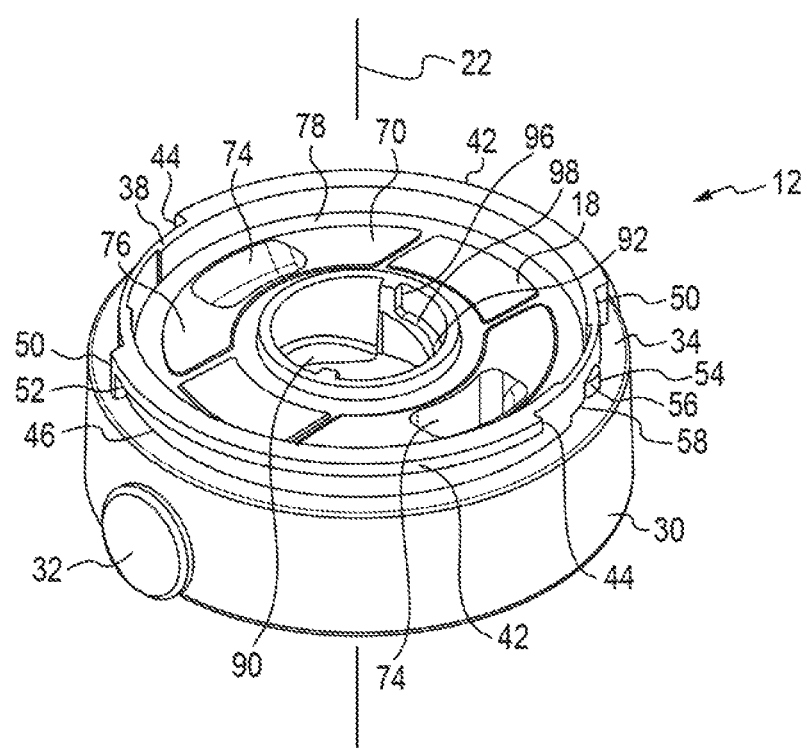
FIG. 4 is a perspective view of an upper side of a bottom of the lid assembly of FIG. 1 with a top seal connected with the bottom.

As more clearly seen in FIG. 4, the bottom 12 includes a lower sidewall section 30, which is cylindrical in the illustrated embodiment. Strap connectors 32 extend outwardly from the lower sidewall section 30 to allow a strap to connect with the lid assembly 10. A shoulder 34 extends inwardly from the lower sidewall section 30 and is disposed normal to the rotational axis 22, which is also a central axis of the lid assembly 10. An upper sidewall section 38 is slightly reduced in diameter as compared to the lower sidewall section 30 and extends upwardly from the shoulder 34.

Two flanges 42 are provided on the upper sidewall section 38 and ends of each are spaced from each other in a circumferential direction to define two notches 44. Each flange 42 also defines a track 46 in conjunction with the shoulder 34. Each track 46 begins at a respective notch 44 and is closed at one end to limit rotational movement of the top 14 with respect to the bottom 12. The bottom 12 includes travel limits, which include unlocked position travel limits 50 and open position travel limits 52 each defined by a respective flange 42, that cooperate with the top 14. The unlocked position travel limit 50 on one of the flanges 42 is spaced 180° from the unlocked position travel limit 50 on the other flange 42. Similarly, the open position travel limit 52 on one of the flanges 42 is spaced 180° from the open position travel limit 52 for other flange 42 in FIG. 4 (see FIG. 1). The bottom 12 also includes two bumps 54 that each define a closed position travel limit 56. Each bump 54 and the respective closed position travel limit 56 is spaced 180° from the other bump 54 and respective closed position travel limit 56. Two slots 58 extend through the upper sidewall section 38. Each slot 58 is circumferentially aligned with and is positioned below a respective bump 54 to allow the bump 54 and the upper sidewall section 38 to move inwardly when the top 14 is rotated with respect to the bottom 12 under certain circumstances, which will be described in more detail below.

Figure 5:
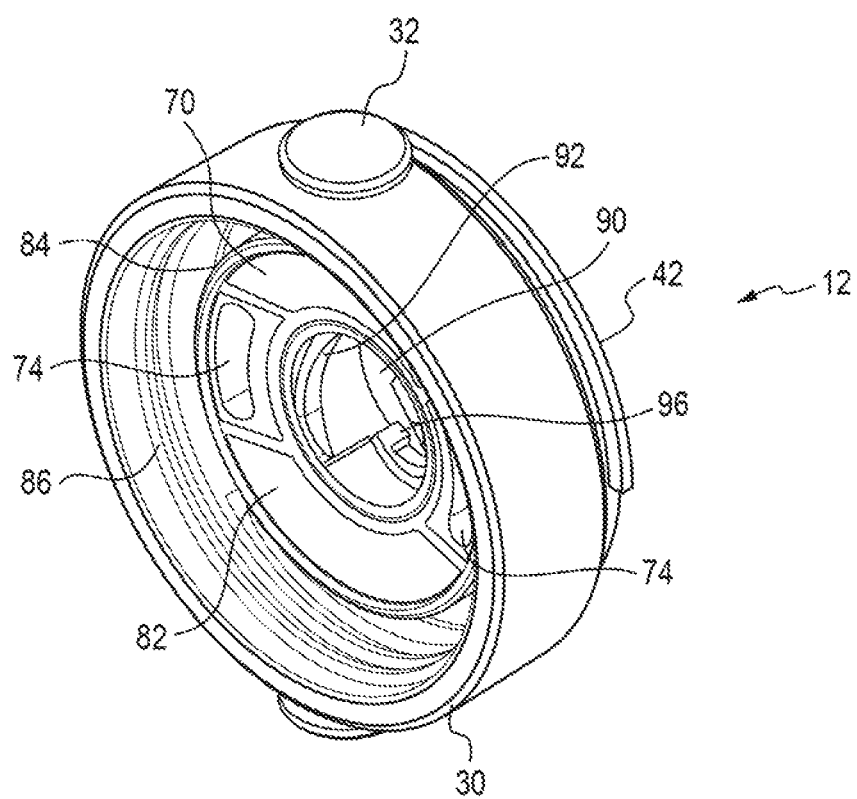
FIG. 5 is a perspective view of a lower side of a bottom of the lid assembly of FIG. 1.

FIG. 4 depicts the top seal 18 connected with the bottom 12. The bottom 12 includes a platform 70 that defines a top seal recess 72, which is more clearly visible in FIG. 1, that receives the top seal 18 to attach the top seal 18 with the bottom 12. The top seal 18 is made from a flexible material, for example a food grade silicone, which allows the top seal 18 to be retained in the top seal recess 72 via a friction fit. Path openings 74 extend through the platform 70 and depending on the orientation of the top 14 with respect to the bottom 12 each path opening can operate as a vent path opening or as a drink path opening. Each of the path openings 74 have the same configuration and they are offset 180° from one another about the rotational axis 22. The path openings 74 could also be much larger, if desired. This is because the plunger 16 can seal against the bottom 12. The platform 70 defines an upper surface 76 that is normal to the rotational axis 22 and is generally coplanar with an upper surface 78 of the top seal 18 when the top seal 18 is received in the top seal recess 72. With reference to FIG. 5, the platform 70 also includes a lower surface 82, which acts as a sealing surface when cooperating with the plunger 16 and the plunger seal 20. A ridge 84 is provided on the lower surface 82 and extends downwardly from the lower surface 82. The ridge 84 is circular in the illustrated embodiment and surrounds or circumscribes each of the path openings 74. Threads 86 can be provided internally on the lower sidewall section 30 to allow the bottom 12 and the lid assembly 10 to connect with a container having a threaded mouth. The lid assembly 10 can connect with the container in other conventional manners.

The bottom 12 also includes a central opening 90 that extends through the platform 70 and is coaxial with the rotational axis 22. The bottom 12 further includes bottom ramps 92 provided internally of the central opening 90. Two bottom ramps 92 are depicted, however, a fewer or greater number could be provided. The bottom ramps 92 cooperate with the plunger 16 such that rotation of the top 14 with respect to the bottom 12 moves the plunger 16 with respect to the bottom 12 in a direction parallel with the rotational axis 22. Each bottom ramp 92 is provided with a respective rotational stop limit 96. Each bottom ramp 92 adjacent to the rotational stop limit 96 includes a horizontal section 98.

Figure 6:
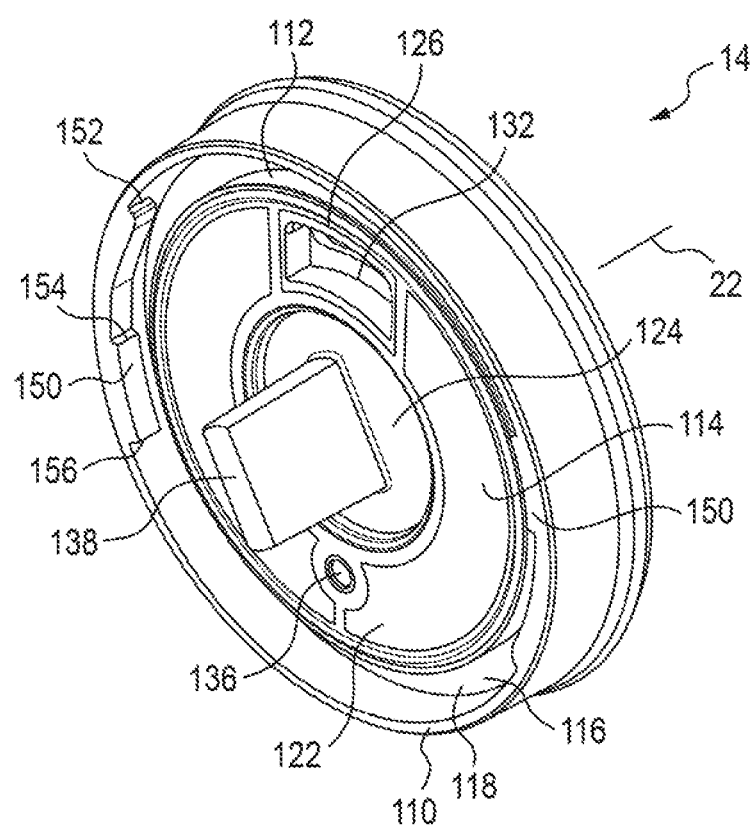
FIG. 6 is a perspective view of a lower side of a top of the lid assembly of FIG. 1.

With reference to FIG. 6, the top 14 includes an outer side wall 110, which is cylindrical in the illustrated embodiment. The top 14 also includes an internal wall 112 offset radially inwardly from the outer side wall 110. The outer side wall 110 and the internal wall 112 are concentric about the rotational axis 22. The top 14 also includes a cover section 114 surrounded by the outer side wall 110. An annular recess 116 is provided between the outer side wall 110 and the internal wall 112 and is further defined by an outer lower surface 118 of the cover section 114 between the outer side wall 110 and the internal wall 112. When the top 14 is connected with the bottom 12, the upper sidewall section 38 is received within the annular recess 116. The cover section 114 further includes an intermediate lower surface 122, which is the lower most surface of the top 14. The intermediate lower surface 122 is annular and surrounds a central lower surface 124, which is recessed upwardly from the intermediate lower surface 122. A peripheral ridge 126 extends downwardly from the intermediate lower surface 122 adjacent to the periphery of the intermediate lower surface 122. The peripheral ridge 126 engages the top seal 18 when the lid assembly 10 is assembled.

The top 14 includes a drink opening 132, which extends through the cover section 114 from the intermediate lower surface 122 to an upper surface 134 (FIG. 1) of the cover section 114. The top 14 also includes a vent opening 136 that extends through the cover section 114 from the intermediate lower surface 122 to the upper surface 134. The drink opening 132 is larger than the vent opening 136 and is similar in size to each path opening 74 in the bottom 12. The center of the drink opening 132 is offset 180° from the center of the vent opening 136. The top 14 further includes an extension 138 extending downwardly from the central lower surface 124. The extension 138 extends through the central opening 90 in the bottom 12 to connect the top 14 with the plunger 16.

The top 14 further includes two tabs 150 with respective ends of each offset 180° from one another. Each tab 150 extends inwardly from the outer side wall 110 and cooperates with the travel limits 50, 52, and 56 on the bottom 12 to limit rotational movement of the top 14 with respect to the bottom 12. Each tab 150 is configured to be received within a respective notch 44 on the bottom 12 to allow for selective attachment and detachment of the top 14 from the bottom 12. Each tab 150 is also configured to be trapped in the track 46 between the flange 42 and the shoulder 34 when the top 14 is connected with the bottom 12.

Each tab 150 includes a first end travel limit 152, an intermediate travel limit 154, and a second end travel limit 156. As mentioned above, the top 14 rotates about the rotational axis 22 with respect to the bottom 12 to move the lid assembly 10 between an open position and a closed position. The top 14 can rotate with respect to the bottom 12 also into an unlocked position. Each first end travel limit 152 contacts a respective closed position travel limit 56 when the top 14 is in the closed position. Each first end travel limit 152 contacts a respective unlocked position travel limit 50 when the top 14 is in the unlocked position. Each tab 150 rides over a respective closed position travel limit 56 when moving from the closed position toward the unlocked position. The slots 58 positioned below a each bump 54 allow the bump 54 and the upper sidewall section 38 to move inwardly when the top 14 is rotated with respect to the bottom 12 from the closed position toward the unlocked position. When the top 14 is in the unlocked position, the top 14 can be removed from the bottom 12 because each tab 150 is aligned with a respective notch 44 so that each tab 150 moves through a respective notch 44 when moving the top 14 axially along the rotational axis 22 away from the bottom 12. Each intermediate travel limit 154 contacts a respective closed position travel limit 56 when the top 14 is in the unlocked position. Each second end travel limit 156 contacts a respective open position travel limit 52 when the top 14 is in the open position.

The top 14 rotates about the rotational axis 22 with respect to the bottom 12 between to move the lid assembly 10 between the open position in which the drink opening 132 is aligned with the path opening 74 operating as the drink path opening and a closed position in which the drink opening 132 is offset from the path opening 74 operating as the drink path opening. Also, the vent opening 136 is aligned with the path opening 74 operating as the vent path opening when the top 14 is in the open position, and the vent opening 136 is offset from the path opening 74 operating as the vent path opening when the top 14 is in the closed position. The top 14 rotates in a first, e.g., clockwise, direction from the closed position toward the open position. The top 14 rotates in a second, e.g., counterclockwise, direction from the closed position toward the unlocked position.

With reference back to FIG. 1, the top seal 18 includes an outer section 170, which is circular in the illustrated embodiment. The top seal 18 further includes an inner section 172, which is also circular in the illustrated embodiment. The outer section 170 and the inner section 172 are centered about the rotational axis 22. The inner section 172 surrounds an inner central hole 174. The top seal 18 also includes two path seal sections 176 on opposite sides of a symmetrical plane on which the rotational axis 22 resides (the symmetrical plane also intersects the center of each path opening 74). Each path seal section 176 extends from the inner section 172 to the outer section 170. The top seal 18 also includes two intermediate openings 178 between the inner section 172, the outer section 170, and the respective path seal sections 176. The top seal 18 is positioned in the top seal recess 72 on the bottom 12 when the lid assembly 10 is finally assembled. The top seal 18 seals against the top 14 to close the drink opening 132 when the top 14 is in the closed position, which can be seen in FIG. 3. The top seal 18 also seals against the top 14 to close the vent opening 136 when the top 14 is in the closed position. The peripheral ridge 126 rides along the outer section 170 of the top seal 18 to preclude liquid from escaping between the top 14 and the bottom 12 other than through the path openings 74 and the drink opening 132 when the top 14 is in either the open position or the closed position.

With reference to FIG. 1, the plunger 16 includes a base 190 and a stem 192 extending upwardly from the base 190. The base 190 is circular in the illustrated embodiment. The base 190 includes a conical upper surface 194, an annular radial surface 196, and a planar upper surface 198. The base 190 also includes a lower surface 202, which is planar in the illustrated embodiment. An elongate tab 204 extends downwardly from the lower surface 202.

The stem 192 is cylindrical in configuration in the illustrated embodiment and is configured to be received within the central opening 90 in the bottom 12. Curved stem ramps 206 extend outwardly from the stem 192 to cooperate with the bottom ramps 92 on the bottom 12. Each stem ramp 206 terminates at an upper stop 208. The stem 192 also includes a top connector opening 210, which is not circular in configuration. The top connector opening 210 receives the extension 138 to connect the top 14 with the plunger 16 such that rotation of the top 14 with respect to the bottom 12 moves the plunger 16 with respect to the bottom 12 in a direction parallel with the rotational axis 22. Rotation of the top 14 from the open position toward the closed position results in upward movement of the base 190 with respect to the bottom 12. Because of the horizontal section 98 on the bottom ramps 92, rotation of the top 14 from the closed position toward the unlocked position does not result in further upward movement of the base 190 with respect to the bottom 12, but instead simply allows the tabs 150 on the top 14 to align with the notches 44 on the bottom 12.

The plunger seal 20 includes a central opening 222 through which the stem 192 protrudes. The plunger seal 20 includes a lower surface 224 that contacts the conical upper surface 194 of the plunger 16 when the plunger seal 20 is placed on the plunger 16. The plunger seal 20 also includes a conical sealing surface 226, which is an upper surface in the illustrated embodiment, that faces toward the lower surface 82 on the bottom 12. The conical sealing surface 226 on the plunger seal 20 presses against the ridge 84 provided on the lower surface 82 of the bottom 12 to block fluid in the associated drink container to which the lid assembly 10 from flowing through the path opening 74 operating as the drink path opening and the drink opening 132.

Figure 7:
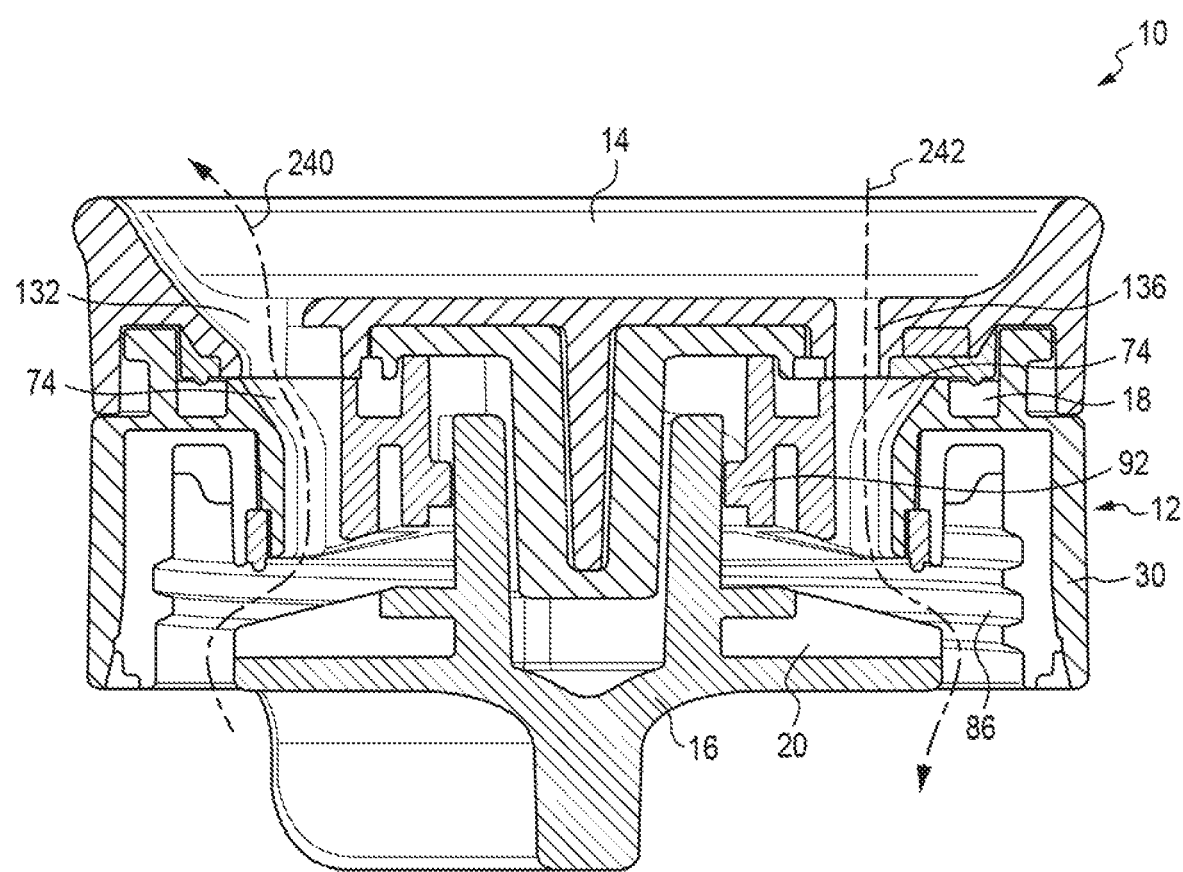
FIG. 7 is a cross-sectional view of the lid assembly of FIG. 1 in the open position.

With reference to FIG. 7, when the lid assembly 10 is in the open position a beverage within the container to which the lid assembly 10 is attached can travel along arrow 240 around the plunger 16 and the plunger seal 20, through one of the path openings 74, which is operating as the drink path opening, and through the drink opening 132. Air can travel along arrow 242 and enter the container through the vent opening 136 and one of the path openings 74, which is operating as the vent path opening, and around the plunger 16 and the plunger seal 20.

Figure 8:
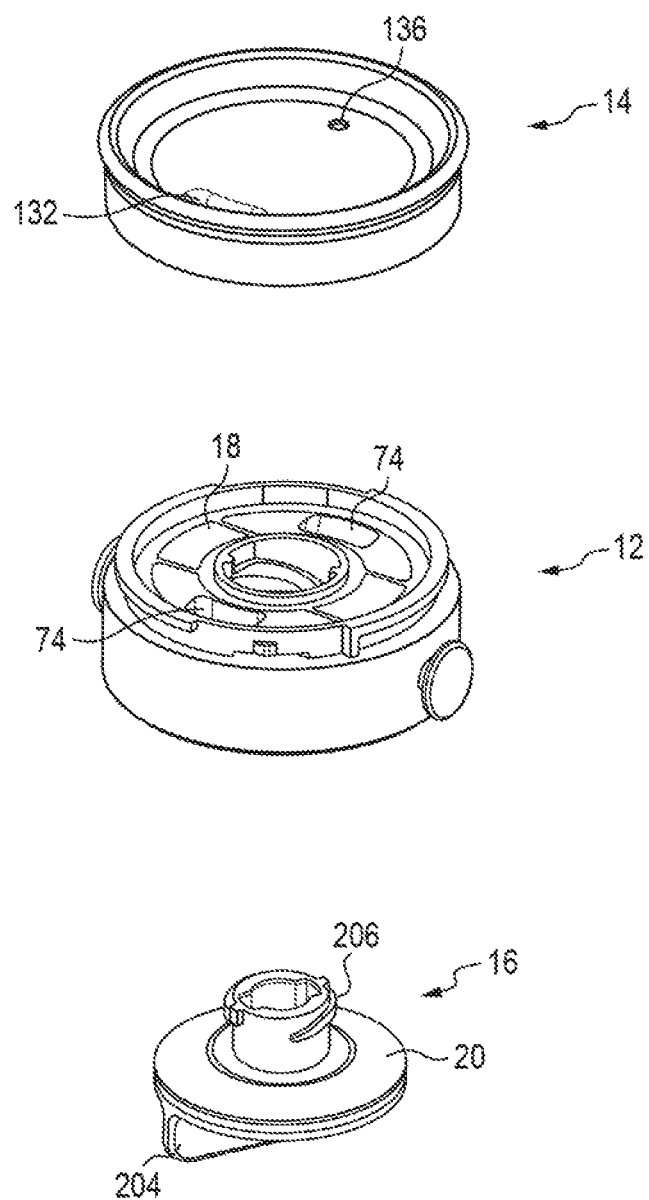
FIG. 8 is a disassembled view of the lid assembly of FIG. 1 for cleaning of the lid assembly.

With reference to FIG. 8, the lid assembly 10 can be disassembled for cleaning. With the top 14 in the closed position, which is shown in FIG. 3, the top 14 is rotated in a counterclockwise direction (per the orientation in FIG. 3) to the unlocked position. The top 14 can then be removed from the bottom 12 by pulling along the rotational axis 22. With the top 14 removed from the bottom 12, the plunger 16 can be unthreaded from the bottom 12. The lid assembly 10 can be reassembled by threading the plunger 16 into the central opening 90 in the bottom 12 until each upper stop 208 contacts a respective rotational stop limit 96. The extension 138 on the top 14 is inserted into the top connector opening 210 and the top 14 is pushed along the rotational axis 22 toward the bottom 12. The top 14 is then rotated with respect to the bottom toward the open or closed position. Due to the symmetry of the top 14 and the path openings 74 in the bottom 12, the top 14 is connectable to the bottom 12 and the plunger 16 in a first orientation and a second orientation in which the top 14 is rotated about the rotational axis 22 180° from the first orientation.

The components of the lid assembly 10 can be modified from the embodiment shown in the drawings. For example, the ridge 84 could be provided on the plunger 16. Also, the plunger 16 and the top 14 could connect to each other in other manners, for example, the plunger 16 could include the male part of the connection and the top 14 could include the female part. Also, the tabs 150 on the top 14 could be provided on the bottom 12, and the flanges 42 on the bottom 12 could be provided on the top 14. These are just a few examples of some modifications. Embodiments of a lid assembly 10 for a drink container have been described above in particularity. Modifications and alterations will occur to those upon reading and understanding the preceding detailed description. The invention, however, is not limited to only the embodiments described above. Instead, the invention is broadly defined by the appended claims and the equivalents thereof. It will be appreciated that various of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A lid assembly for a drink container comprising:
a top including a drink opening;
a bottom including a drink path opening; and
a plunger connectable with the top and threadingly connected to the bottom,
with the plunger connected with the top and the bottom the top is rotatable about a rotational axis with respect to the bottom to move the plunger in a direction parallel with the rotational axis such that the lid assembly is movable into an open position in which fluid in an associated drink container to which the lid assembly is attached is able to flow around the plunger and through the drink opening, a closed position in which fluid in the associated drink container to which the lid assembly is connected is blocked by the plunger from flowing through the drink opening, and an unlocked position in which the top is removable from the bottom by moving the top with respect to the bottom in a direction parallel with the rotational axis.

2. The lid assembly of claim 1, when the top is first removed from the bottom, the plunger remains threadingly connected to the bottom, and the plunger is then removable from the bottom by moving the plunger with respect to the bottom in a direction parallel with the rotational axis.

3. The lid assembly of claim 1, when the top is first removed from the bottom, the plunger remains threadingly connected to the bottom, and the plunger is then removable from the bottom by rotating the plunger about the rotational axis with respect to the bottom and moving the plunger with respect to the bottom in a direction parallel with the rotational axis.

4. The lid assembly of claim 1, wherein the top rotates in a first direction from the closed position toward the open position, and the top rotates in a second, opposite, direction from the closed position toward the unlocked position.

5. The lid assembly of claim 4, wherein the top is removable from the bottom and the plunger, and the top is connectable to the bottom and the plunger in a first orientation and a second orientation in which the top is rotated about the rotational axis 180 degrees from the first orientation.

6. The lid assembly of claim 1, wherein the bottom includes a vent path opening and the top includes a vent opening, the vent opening is aligned with the vent path opening when in the open position, the vent opening is offset from the vent path opening when in the closed position.

7. The lid assembly of claim 1, wherein the bottom includes a vent path opening having the same configuration as and offset 180 degrees from the drink path opening about the rotational axis.

8. The lid assembly of claim 1, further comprising a tab on one of the top and the bottom and a flange on the other of the top and the bottom, the flange defining a track and having a notch formed therein, wherein the tab is configured to pass through the notch to allow for selective attachment and detachment of the top from the bottom, and the tab is also configured to be trapped in the track when the top is connected with the bottom.

9. The lid assembly of claim 8, further comprising travel limits on one of the top and the bottom, wherein the tab engages a closed position travel limit when the lid assembly is in the closed position, and the tab rides over the closed position travel limit when moving from the closed position toward the unlocked position.

10. The lid assembly of claim 1, further comprising a ridge on one of an upper sealing surface on the plunger and a lower sealing surface on the bottom, wherein the ridge surrounds the drink path opening.

11. The lid assembly of claim 10, wherein the bottom includes a vent path opening and the ridge surrounds the vent path opening.

12. The lid assembly of claim 1, further comprising a plunger seal separate from the plunger and located on an upper surface of the plunger.

13. The lid assembly of claim 1, wherein the bottom includes a central opening coaxial with the rotational axis, the plunger includes a stem extending through the central opening, the stem engages the top to connect the plunger with the top.

14. The lid assembly of claim 13, wherein the stem includes stem ramp and the bottom includes a bottom ramp in the central opening, wherein the stem ramp cooperates with the bottom ramp to move the plunger in the direction parallel with the rotational axis as the top rotates with respect to the bottom.

15. The lid assembly of claim 14, wherein the top includes an extension and the stem includes a top connector opening that receives the extension to connect the plunger with the top.

16. The lid assembly of claim 1, further comprising a top seal on the bottom, the top seal seals against the top to close the drink opening when the top is in the closed position.

17. The lid assembly of claim 16, wherein the bottom includes a vent path opening and the top includes a vent opening, the vent opening is aligned with the vent path opening when the top is in the open position, the vent opening is offset from the vent path opening when the top is in the closed position, and the top seal seals against the top to close the vent opening when the top is in the closed position.

18. The lid assembly of claim 17, wherein the top seal is symmetrical on opposite sides of a plane on which the rotational axis resides.

19. A lid assembly for a drink container comprising:
a top including a drink opening;
a bottom including a drink path opening; and
a plunger connectable with the top and the bottom,
with the plunger connected with the top and the bottom the top is rotatable about a rotational axis with respect to the bottom to move the plunger in a direction parallel with the rotational axis such that the lid assembly is movable into an open position in which fluid in an associated drink container to which the lid assembly is attached is able to flow around the plunger and through the drink opening, a closed position in which fluid in the associated drink container to which the lid assembly is connected is blocked by the plunger from flowing through the drink opening, and an unlocked position in which the top is removable from the bottom by moving the top with respect to the bottom in a direction parallel with the rotational axis,
wherein the top rotates in a first direction from the closed position toward the open position, and the top rotates in a second, opposite, direction from the closed position toward the unlocked position.

* * * * *